United States Patent [19]

Buxbaum et al.

[11] 4,297,395

[45] Oct. 27, 1981

[54] PRODUCTION OF COBALT-DOPED FERRIMAGNETIC IRON OXIDES

[75] Inventors: Gunter Buxbaum; Heinrich-Christian Schopper; Lutz Leitner; Volker Hahnkamm, all of Krefeld, Fed. Rep. of Germany

[73] Assignee: Bayer Aktiengesellschaft, Leverkusen, Fed. Rep. of Germany

[21] Appl. No.: 110,876

[22] Filed: Jan. 10, 1980

[30] Foreign Application Priority Data

Jan. 31, 1979 [DE] Fed. Rep. of Germany ....... 2903593

[51] Int. Cl.$^3$ .............................................. C01G 49/02
[52] U.S. Cl. ................................ 427/127; 252/62.56; 252/62.62
[58] Field of Search ........................ 252/62.56, 62.62; 427/127, 128, 130, 131

[56] References Cited

U.S. PATENT DOCUMENTS

| | | | |
|---|---|---|---|
| 3,573,980 | 4/1971 | Haller et al. ................... | 252/62.56 |
| 3,748,270 | 7/1973 | Hwang ............................ | 252/62.56 |
| 3,931,025 | 1/1976 | Woditsch et al. ........... | 252/62.56 X |
| 3,953,656 | 4/1976 | Tokuoka et al. ............. | 252/62.56 X |
| 4,015,030 | 3/1977 | Sasazawa et al. ............ | 252/62.56 X |
| 4,052,326 | 10/1977 | Schoenafinger et al. ....... | 252/62.56 |
| 4,136,049 | 1/1979 | Horiishi et al. ................. | 252/62.56 |

FOREIGN PATENT DOCUMENTS 2526363  1/1976  Fed. Rep. of Germany ... 252/62.56

*Primary Examiner*—Jack Cooper
*Attorney, Agent, or Firm*—Sprung, Felfe, Horn, Lynch & Kramer

[57] ABSTRACT

A cobalt-doped, acicular ferrimagnetic iron oxide having an FeO content of about 16 to 24%, by weight, and a cobalt content of about 0.7 to 2.4%, by weight, the coercive force amounting to at least about 425 Oe+175 Oe/%, by weight, of Co is produced by precipitating and oxidizing a cobalt-containing aqueous iron (ii) salt solution, reducing the precipitate to $Fe_3O_4$, partially reoxidizing to adjust the FeO content and heat treating under inert conditions at a temperature from about 600° to 800° C.

2 Claims, 1 Drawing Figure

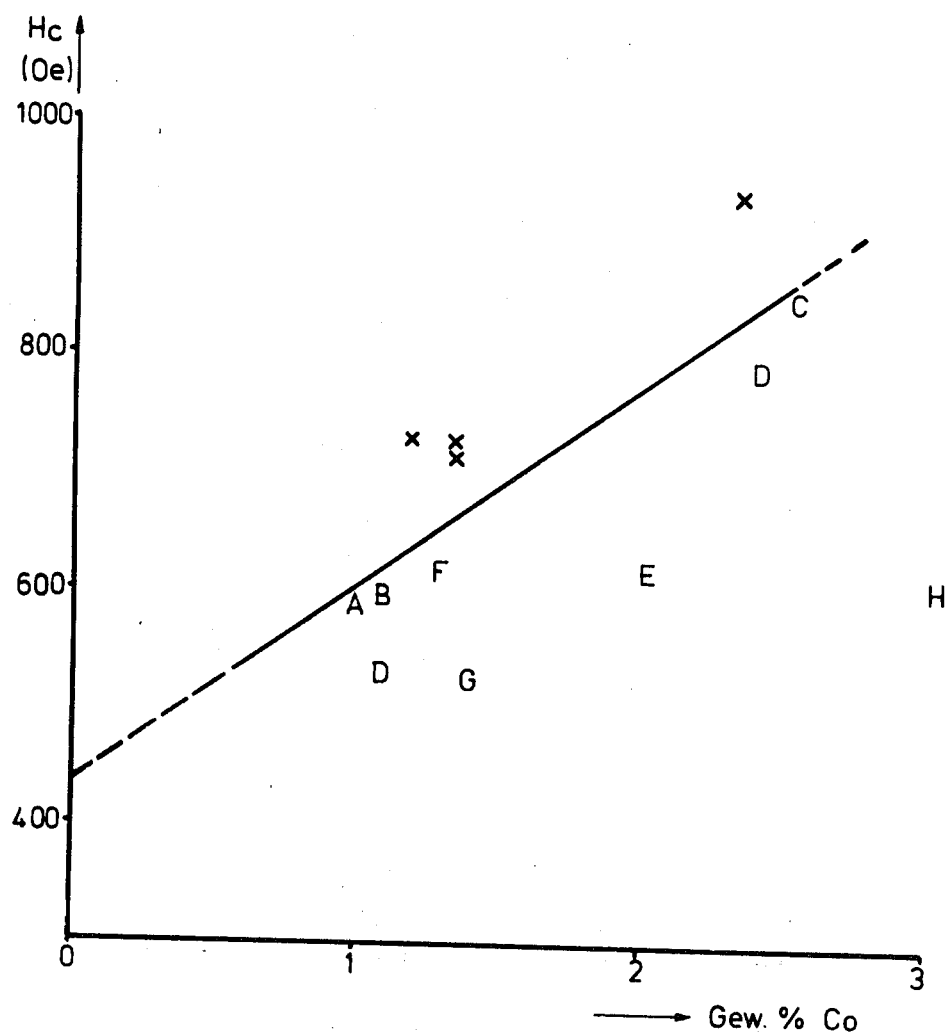

PRODUCTION OF COBALT-DOPED FERRIMAGNETIC IRON OXIDES

This invention relates to cobalt-doped ferrimagnetic iron oxides having a low cobalt content and high coercive forces and to a process for the production thereof.

Cobalt-doped iron oxide pigments in the form of $\gamma$-$Fe_2O_3$ or $Fe_3O_4$ or mixed phases of $Fe_3O_4$ and $\gamma$-$Fe_2O_3$ are used for magnetic signal recording, preferably in high-quality audio and video tapes. They show more favorable magneto-thermal behavior and less head wear than chromium dioxide.

Coercive field strengths of from 600 to 1000 Oe are of particular interest for the above-mentioned application, the range of from 600 to 800 Oe being commercially used at the present time. Since there have never been any undoped magnetic iron oxides capable of reaching coercive forces $I^HC$ above 500 Oe after incorporation into a tape, research work in this field has long been devoted to the development of cobalt-doped iron oxides in which doping is carried out either by co-precipitation during production of the $\alpha$-FeOOH, by precipitation onto $\alpha$-FeOOH or $\alpha$-$Fe_2O_3$ precursor compounds or by precipitation onto $\gamma$-$Fe_2O_3$.

According to the prior art, the pigments have to have a relatively high cobalt content in order to reach the high coercive field strengths required. The high cobalt contents adversely affect magneto-thermal behavior, i.e. there is a reduction in saturation magnetization, remanence and coercive field strength with increasing temperature.

There has been no shortage of attempts to reduce this deterioration in the properties. According to the prior art, the above-mentioned disadvantages are reduced by surface-coating the pigments with cobalt (cf. for example Y. Tokuoka, S. Umeki, Y. Imaoka; Europhy Conf. Abstr. 1976 2 B, Int. Conf. Ferrites, pages 92 to 93). In this connection, it has repeatedly been proposed to obtain improvements by complicated precipitation processes (so-called "epitaxial growth"), but unfortunately no reduction in the necessary cobalt content has ever been achieved. The high coercive field strength and the favorable magneto-thermal behaviour of substances produced in this way is said to be attributable to the pronounced inhomogeneous distribution of cobalt in the individual particles, most of the cobalt ions being said to be located on or near the crystallite surfaces. In such cases, it is no longer possible to speak in terms of cobalt doping.

It has now been found that iron oxide pigments containing cobalt in substantially uniform distribution show superior magnetic properties, despite a very low cobalt content, providing the uniform distribution of cobalt is structurally stabilized.

Accordingly, the present invention relates to cobalt-doped, acicular ferrimagnetic iron oxides having an FeO content of about 16 to 24%, by weight, and a cobalt content of about 0.7 to 2.4%, by weight, the coercive force thereof amounting to at least about 425 Oe+175 Oe/%, by weight, of Co.

The coercive force of the iron oxides according to the present invention preferably amounts to about 425 Oe+200 Oe/%, by weight, of cobalt. The FeO content preferably amounts to about 20 to 23%, by weight. Iron oxide pigments having a cobalt content of preferably about 1 to 2%, by weight, lie in the from 600 to 800 Oe range currently being used in practice for high-quality audio and video tapes.

In addition to cobalt, the iron oxide pigments according to the present invention may also contain other ions, such as calcium, magnesium, manganese, cadmium, copper, chromium, nickel, zinc, aluminum, titanium, zirconium, $SiO_2$, $B_2O_3$ and/or $P_2O_5$. A zinc content of about 0.1 to 2%, by weight, is preferred, a zinc content of about 0.1 to 2%, by weight, and a $P_2O_5$ content of about 0.1 to 2%, by weight, being particularly preferred.

Such magnetic pigments are eminently suitable for use in audio tapes for the $CrO_2$ bias and as a surface layer in multi-layer tapes.

The iron oxide pigments according to the present invention are particularly suitable for use in the new video recording systems, for example VHS, Betamax and LVR. On account of the slow tape speed, high orientability ($B_r/B_s$=remanent magnetization/saturation magnetization as measured in the tape direction) is required for good audio properties. The pigments according to the present invention have orientability values of greater than about 0.8, preferably greater than about 0.85, and are therefore eminently suitable for this purpose.

In the commercially used range in particular, the pigments according to the present invention reach the required coercive field strengths of from 600 to 800 Oe for substantially half the cobalt content of the best known and commercially available iron oxide pigments.

The FIGURE shows a graph illustrating the dependence of the coercive field strength $I^HC$ upon the cobalt content of the pigments. The straight line represents the composition $$I^HC = 425 + 175 \cdot p,$$

$I^HC$ being the coercive field strength in Oe and p being the cobalt content in percent, by weight. The crosses above the curve illustrate the relation obtained in the case of the following examples for the pigments according to the present invention. The letters appearing in the graph represent the corresponding relation for the best of the cobalt-containing iron oxide pigments according to the prior art and the best of the commercially available products. These letters are respectively indicative of the following sources;

A: German Offenlegungsschrift No. 2,308,791
B: German Offenlegungsschrift No. 2,413,430
C: German Offenlegungsschrift No. 2,649,714
D: German Auslegeschrift No. 1,907,238
E: German Offenlegungsschrift No. 2,629,931
F: German Offenlegungsschrift No. 2,252,564
G: XMO 497, a product of Hercules Powders Inc.
H: 2566, a product of the Pfizer company.

By virtue of the lower cobalt content thereof, the iron oxide pigments according to the present invention show superior magneto-thermal behavior, i.e. an improved temperature stability of saturation magnetization, remanence and coercive field strength.

After incorporation of the magnetic pigment according to the present invention into a magnetic tape produced in the conventional way by grinding 26.85%, by weight, of magnetic iron oxide,
6.71%, by weight, of polyester urethane (Esthane 5707 F 1, a product of the B. F. Goodrich Corp.)
1.01%, by weight, of complex phosphoric acid ester
0.67%, by weight, of di-(ethyl hexyl)-phthalate 0.03%, by weight, of silicone oil,
0.27%, by weight, of butoxy ethyl stearate,
44.6%, by weight, of tetrahydrofuran,
6.35%, by weight, of cyclohexanone,
13.51%, by weight, of methyl ethyl ketone, for 3.5 hours in a pearl mill, subsequently casting the lacquer onto a polyester film stretched three times, orientation in the magnetic field, drying and calendering, the coercive field strength, as measured in the tape direction, surprisingly increases by up to 100 Oe. Accordingly, coercive field strengths of 800 Oe and higher are obtained using approximately 1.2%, by weight, of cobalt.

A further slight increase in coercive force of up to about 5% is frequently observed during storage of the pigments under atmospheric conditions or even in the absence of air at room temperature over a period of approximately one month or longer.

The present invention also relates to a process for the production of the cobalt-doped iron oxide pigments according to the present invention by protecting acicular cobalt-containing iron (III) oxide hydroxide obtained from aqueous iron (II) salt solutions by precipitation and oxidation at least partly in the presence of cobalt ions against sintering by modification with inorganic or organo-elemental compounds, followed by reduction to $Fe_3O_4$ and by partial reoxidation in an oxygen-containing gas to adjust the FeO content, characterized in that adjustment of the FeO content is followed by a heat treatment carried out under inert conditions at a temperature of about 600° to 800° C.

The cobalt ions may be introduced at any stage of the precipitation reaction. It is also possible to precipitate the cobalt onto the FeOOH- particles on completion of precipitation, although this has to be carried out in the precipitation suspension. The cobalt is advantageously co-precipitated with the $\alpha$-FeOOH. It is particularly preferred to precipitate the cobalt by the addition of water-soluble cobalt salts of mineral acids, particularly sulphuric acid, after a $\alpha$-FeOOH nuclei have been formed because in this way the pigment is provided with a particularly narrow particle size distribution.

The modification with inorganic compounds to prevent sintering may be carried out by the simultaneous precipitation of ions, for example, of calcium, magnesium, manganese, cadmium, copper, chromium, nickel, zinc, aluminum, titanium and/or zirconium and/or of $SiO_2$, $B_2O_3$ or $P_2O_5$. The ions are introduced into the precipitation suspension in the form of water-soluble compounds, preferably mineral acids, for example salts of sulphuric acid. Quantities of about 0.1 to 5% of the modifying substances, based on the iron oxide, are sufficient. The modifying substances may also be precipitated onto the FeOOH particles after precipitation of the iron oxide hydroxide. In this case, the modifying substances should be precipitated in the precipitation suspension.

The $\alpha$-FeOOH particles obtained are separated off from the precipitation suspension, washed and freed from water in the conventional way and subsequently tempered, advantageously at temperatures of from 600° to 800° C. This is followed by reduction to $Fe_3O_4$ using moist hydrogen at temperatures of about 300° to 500° C. After the magnetite has been cooled to about 100° to 200° C., the FeO content according to the present invention of from 16 to 24%, by weight, is adjusted by the introduction of a certain quantity of air, preferably diluted with nitrogen.

The process according to the present invention is preferably carried out in accordance with the process described in U.S. Pat. No. 3,931,025. In this process, an $\alpha$-FeOOH seed suspension is prepared with addition of zinc and phosphate ions and formation of the pigment is carried out with addition of the required quantity of cobalt in the form of water-soluble salts together with alkalis. Towards the end of the pigment-forming reaction, a solution of phosphates, preferably pyrophosphate, is added in quantities of from about 0.2 to 1%, by weight, of $P_2O_5$. The $\alpha$-(FeCo)OOH-pigment powder is freed from water, tempered, reduced to magnetite and re-oxidized in the manner described, the re-oxidation step only being continued up to the FeO-content according to the present invention.

The crucial stop of the process according to the present invention is a tempering step carried out after the final FeO content has been adjusted. This tempering step produces a substantially uniform distribution of cobalt in the pigment and an apparently specific structural stabilization of the pigment which is responsible for the high coercive forces according to the present invention.

The tempering step is preferably carried out in an atmosphere of $CO_2$ and/or $N_2$. The presence of a small amount of oxygen in the atmosphere substantially equivalent to the oxygen partial pressure of $CO_2$ at the temperature applied is advantageous and does not affect the FeO content.

Surprisingly, such a high-temperature tempering treatment does not lead to the expected deterioration in remanence through the formation of $\alpha$-$Fe_2O_3$, instead the remanent magnetization is very surprisingly increased.

A slight decomposition reaction, for example of the following type:

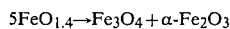
$$5FeO_{1.4} \rightarrow Fe_3O_4 + \alpha\text{-}Fe_2O_3$$

cannot be ruled out. However, the $\alpha$-$Fe_2O_3$ formed is deposited in such finely crystalline form that it cannot be detected by X-ray photography. It may also be epitaxially deposited on the cubic $Fe_3O_4$-phase in such a way that, by effects of lattice strains, it leads to the surprising increase in coercive field strength. Without crystallite growth occurring to any significant extent, tempering at temperatures above 600° C. increases the crystalline order of the $Fe_3O_4$ - $\gamma$- $Fe_2O_3$ disordered phases, remedies lattice imperfections and thus improves the magnetic properties. Although no proof is available, it may be assumed that an ordered phase is formed during tempering as a structural variant of the spinel structure, for example having the following composition:

$$Fe_{24}[Fe_{30}{}^{3+}(Fe_{14},Co)^{2+}\square_3]O_{96}$$

for a cobalt content of approximately 1.1%, by weight. The ions in the square brackets represent the ions and the lattice voids symbolized by □ , with octahedral oxgyen co-ordination, while the iron ions outside the brackets are those with tetrahedral oxygen co-ordination. Such an superstructure might also explain the surprising increase in coercive field strength.

The tempering step may be carried out over a period of from a few minutes to several hours, the shorter tempering times being applied at higher temperatures. The tempering step is preferably carried out at a temperature of about 600° to 700° C. over a period of about 10 minutes to 1 hour. An important requirement is that cooling should also take place in an inert gas atmosphere.

The tempering treatment may be followed by stabilization against oxidation in air carried out in accordance with German Offenlegungsschrift No. 2,625,139. Consolidation using ball mills or roller mills may be carried out in the conventional way, as may any of the conventional after-treatments for improving dispersibility in lacquers.

The present invention is illustrated by the following examples, of which Examples 1, 2, 3 and 5 are comparison examples while Examples 4, 6, 7 and 8 correspond to the present invention. The coercive field strength and remanent magnetization were measured using a sample vibration magnetometer at a maximum field strength of 3.5 kOe. Since the coercive field strength is dependent on density, the samples were consolidated to a density of approximately 0.6 g/cc. At this density the $I^{H}C$- dependence is still not so large that the measured values shown troublesome deviations in the event of minor deviations in density.

EXAMPLE 1 (Comparison Example):

28.3 g of $ZnSO_4.7\ H_2O$ in 0.2 l of $H_2O$, 16.7 g of $KCr(SO_4)_2.12\ H_2O$ in 0.2 l of $H_2O$ and 11.5 g of $NaH_2PO_4.2\ H_2O$ in 0.2 l of $H_2O$ are added to 22 l of an $FeSO_4$ solution containing 135 g/l, followed by the addition at 30° C., of 1.19 l of sodium hydroxide (622 g/l) diluted to 1.8 l. An α-FeOOH seed suspension is prepared by uniform heating with stirring to 75° C. over a period of 5 hours. A solution of 97.2 g of $CoSO_4.7\ H_2O$ in 0.3 l of $H_2O$ was then added and the pH increased from 2.8 to 4.0 over a period of 16 hours by the uniform addition, with stirring, of sodium hydroxide (195 g/l) together with air. The pH is then increased to 7.5 over a period of 2 hours and a solution of 20.7 g of $Na_4P_2O_7$ in 0.6 l of $H_2O$ added over a period of 30 minutes, followed by stirring for another 30 minutes. After washing and drying at 120° C. the α-FeOOH pigment is freed from water at 300° C. and tempered for 30 minutes at 600° C. Reduction to $Fe_3O_4$ is carried out using moist hydrogen over a period of 30 minutes at 400° C., followed by cooling under nitrogen. The remanent magnetization (Br/g) amounts to 441 Gcc/g and the coercive field strength $I^{H}C$ to 412 Oe.

EXAMPLE 2 (Comparison Example)

The product of Example 1 was tempered for 30 minutes at 650° C. Br/g=471 Gcc/g, $I^{H}C$=465 Oe.

EXAMPLE 3 (Comparison Example)

60 g of the product of Example 1 were treated for 30 minutes at 170° C. with 7.5 l/h of air and 100 l/h of $N_2$ in a tube furnace. Br/g=453 Gcc/g, $I^{H}C$=467 Oe.

EXAMPLE 4

The magnetic pigment of Example 3 was tempered for 30 minutes at 650° C. in an atmosphere of $N_2/CO_2$. Br/g=501 Gcc/g, $I^{H}C$=725 Oe. Analysis revealed an FeO content of 21.5%, by weight, and a Co content of 1.35%, by weight. An $I^{H}C$ value of 806 Oe was determined on a magnetic tape made of this sample.

EXAMPLE 5 (Comparison Example)

60 g of the magnetic pigment of Example 1 were treated for 30 minutes at 170° C. with 8.8 l/h of air and 100 l/h of nitrogen. Br/g=455 Gcc/g, $I^{H}C$=480 Oe.

EXAMPLE 6

The product of Example 5 was tempered for 30 minutes at 650° C. under $N_2\ CO_2$. The FeO content amounted to 19.2%, by weight. Br/g=480 Gcc/g and $I^{H}C$=713 Oe. The coercive force yield amounted to 213 Oe/%, by weight, of Co. A $B_r/B_s$ value of 0.85 and an $I^{H}C$ value of 813 Oe were determined on the magnetic tape.

EXAMPLE 7

Following the procedure of Example 1, the seed suspension is prepared over a period of 5.5 hours from 8000 kg of $FeSO_4$, 75.7 kg of $ZnSO_4.7\ H_2O$ and 30.9 kg of $NaH_2PO_4.2\ H_2O$ in 40 m³ of water using 2000 kg of NaOH in 5 m³ of water and approximately 1000 m³/h of air. Following the addition of 245.5 kg of $CoSO_4.7\ H_2O$, pigment formation was carried out over a period of 16 hours at pH 3.5 by the addition of more sodium hydroxide and air. The pH is then increased in units of 0.2 at 15 minute intervals. At pH 7.5, 15 liters of the pigment suspension are removed and an emulsion of 4.55 g of a polydimethyl siloxane (silicone oil "M 100", a product of Bayer AG) in 73 ml of water is added while stirring at 80° C. with introduction of air, followed by stirring for 15 minutes. A solution of 3.4 g of $Na_4P_2O_7$ in 0.2 l of water is then added dropwise, followed by stirring for 30 minutes. After washing and drying, the pigment powder is freed from water at 300° C., tempered for 30 minutes at 640° C. and reduced using moist hydrogen at 400° C. Br/g=441 Gcc/g, $I^{H}C$=392 Oe. 130 g of this product are oxidized with air/$N_2$ for 12 minutes at 190° C. in a fluidized bed, followed by tempering for 30 minutes at 650° C. in an atmosphere of $N_2/CO_2$. Br/g=478 Gcc/g, $I^{H}C$=728 Oe, FeO content=21%, by weight; Co content=1.25%, by weight.

After incorporation into a magnetic tape, a coercive field strength of 800 Oe is measured.

EXAMPLE 8

340 g of $ZnSO_4.7\ H_2O$ and 137 g of $NaH_2PO_4.2\ H_2O$ are added to 264 l of an iron sulphate solution (135 g/l). 20 liters of sodium hydroxide (480 g/l) are then added, with stirring, over a period of 10 minutes at 30° C. Seed formation is then carried out over a period of 5.5 hours using 0.7 m³/h of air, the temperature being uniformly increased to 77° C. Pigment formation is then carried out over a period of 14.5 hours by the controlled addition of more sodium hydroxide (200 g/l) and 8 m³/h of air. 11 hours after the beginning of pigment formation, when the pH is 3.6 and 40 liters of sodium hydroxide have been comsumed, a solution of 2.09 kg of $CoSO_4.7\ H_2O$ in 4 liters of water is added.

At pH 7.5, a solution of 196 g of $Na_4P_2O_7$ in 4 liters of water is added over a period of 30 minutes, followed by stirring for 30 minutes. After washing and drying, the preliminary α-FeOOH product is tempered for 30 minutes at 600° C., reduced using moist hydrogen for 30 minutes at 400° C., oxidized using air for 18 minutes at 170° C. and tempered for 30 minutes at 650° C. in an atmosphere of $N_2/CO_2$. FeO content=17%, by weight; Co content=2.3%, by weight; Br/g=460, $I^{H}C$=937 Oe.

It will be appreciated that the instant specification and examples are set forth by way of illustration and not limitation, and that various modifications and changes may be made without departing from the spirit and scope of the present invention.

What we claim is:

1. A process for the production of a cobalt-doped iron oxide acicular pigment protected at least partly against sintering comprising forming a suspension of FeOOH seeds in water containing zinc, phosphate and ferrous ions, introducing cobalt ions, adding alkali and air to precipitate ferric and cobalt ions onto the seeds, adding a phosphate solution in quantity of from about 0.2 to 1% by weight of $P_2O_5$ into the water containing the seeds which are now pigment, separating the pigment from the suspension, reducing the pigment to $Fe_3O_4$, oxidizing the $Fe_3O_4$ pigment in an oxygen-containing gas to bring the FeO content in the pigment to about 16 to 24% by weight, and heat treating the oxidized pigment under inert conditions at a temperature of about 600° to 800° C., the amount of zinc, cobalt and phosphate ions present being such as to impart to the end product a content by weight of about 0.7 to 2.4% of cobalt, about 0.1 to 2% of zinc, and about 0.1 to 2% of phosphorus expressed as $P_2O_5$, the coercive force of the resulting pigment amounting to at least about 425 Oe + 175 Oe/%, by weight, of Co.

2. A process according to claim 1, wherein the heat treatment is carried out in an inert gas atmosphere of nitrogen and $CO_2$.